United States Patent [19]

Einarsson Ahlfors

[11] 3,939,065

[45] Feb. 17, 1976

[54] SCREENING DEVICE

[76] Inventor: Sten Eskil Einarsson Ahlfors, Box 3691, S-776 00 Hedemora, Sweden

[22] Filed: Aug. 23, 1973

[21] Appl. No.: 391,038

[30] Foreign Application Priority Data

Aug. 31, 1972 Sweden............................ 11251/72

[52] U.S. Cl. ............... 209/240; 209/270; 209/304; 209/399; 210/377
[51] Int. Cl.² .......................................... B07B 1/22
[58] Field of Search ........... 209/290, 291, 303, 304, 209/270, 273, 397, 399, 300, 240, 243; 210/377, 378

[56] References Cited
UNITED STATES PATENTS

| | | | |
|---|---|---|---|
| 299,684 | 6/1884 | Scharbaw............................ | 209/304 |
| 983,495 | 2/1911 | Hunnicutt........................... | 209/291 |
| 1,228,277 | 5/1917 | Wright............................. | 209/397 X |
| 1,540,917 | 6/1925 | Appel................................ | 210/380 |
| 2,028,168 | 1/1936 | Roberts............................. | 210/380 |
| 2,038,931 | 4/1936 | Goldberg........................ | 209/397 X |
| 2,311,813 | 2/1943 | Beck.................................. | 209/397 |
| 3,363,759 | 1/1968 | Clarke-Pounder................ | 209/273 |
| 3,458,038 | 7/1969 | Young............................. | 209/273 X |
| 3,586,172 | 6/1971 | Young............................. | 209/273 X |

FOREIGN PATENTS OR APPLICATIONS

| | | | |
|---|---|---|---|
| 70,324 | 11/1927 | Sweden.............................. | 209/397 |
| 159,509 | 1/1904 | Germany........................... | 209/397 |
| 196,490 | 4/1923 | United Kingdom................ | 209/397 |
| 507,587 | 7/1927 | Germany.......................... | 209/303 |
| 720,690 | 12/1954 | United Kingdom................ | 209/397 |
| 49,402 | 7/1929 | Norway.............................. | 209/304 |

*Primary Examiner*—Robert Halper
*Attorney, Agent, or Firm*—Pierce, Scheffler & Parker

[57] ABSTRACT

A treatment chamber for purification and fractionation of materials suspensions, particularly fibrous suspensions under pressure, and wherein the treatment chamber includes a rotary screening drum provided with pulsation members, the drum also including screening holes located on the back-side of, or immediately behind, the pulsation members as viewed in the direction of drum rotation.

16 Claims, 30 Drawing Figures

SCREENING DEVICE

The present invention concerns a device for purification and fractionation of materials suspensions, notably fiber suspensions in pulp and/or paper mills and relates to screens of closed centripetal type.

According to the invention the device includes a screening drum equipped with a pulsation organ of a kind being part of the device as described in the Swedish patent application 2528/71 or similar devices.

In the device the injected matter is, according to the above patent application, introduced under the required overpressure into an exterior, ring-shaped chamber from where the fiber suspension first flows inwards through a rotating drum, provided with screen openings (perforations, slits etc.) as well as with pulsation organs arranged in different groups relative to the screen openings, whereupon remaining suspension is further purified/screened inwards through a concentric inner screening drum, rotary or stationary. The accepted matter is taken from the interior of the inner screening drum. Rejected matter is taken partly as coarse reject (containing knots and other coarser wood impurities as well as sand and other heavy particles) from the outer ring-shaped chamber, and partly as fine reject (containing minor, short or long wood impurities as well as other minor heavy particles to the extent that they have not earlier been sorted out) from the space between the two screening drums.

One of the purposes of this invention is by aid of the above procedure and equipment to achieve a purification and fractionation effect with regard to wood impurities as well as heavier particles as has not until now been possible to achieve with one single unit equipped with screening facilities. The high purification effect with regard to heavy particles, both large and small, in most cases enables the dispensing with the power-consuming hydrocyclones in the screening positions for unbleached pulp of different kinds as well as for purification of and as blocking functions against impurities materializing during the manufacture of different pulps before pulp vats and paper-machines.

When using a high-speed rotary screening drum provided with bowl-shaped pulsation organs according to pat. appl. 2528/71, a local pressure wave ensues at and close to the front of each pulsation organ as respects direction of rotation, as well as a suction wave to the leeward of these organs. The through-flow inwards of the suspension through the screen openings nearest to the front of the pulsation organ concerned is facilitated, the opposite being the case for the corresponding openings on the respective leeward sides. Since the volume capacity of the apparatus is large and, as a result, the flow-speed of the suspension inwards through the screen openings considerable, it is impossible, despite the great centrifugal effect in this case, to prevent part of the heavier impurities to pass through the screen openings inwards through the pulsation drum. After this passage, they are still subjected to a high centrifugal effect and collect outwards on to the inside of the drum.

One fundamental characteristic of this invention is the devising and arrangement or grouping of the pulsation organs in a way to cause a return action outwards through a minor number of the screen openings of the drum. Sand particles, rust flakes and other impurities of higher specific weight or higher sedimentation rate than that of the pure fiber are here returned outwards. This return is of the greatest importance for the attaining of optimum purification and fractionation effect using one single apparatus. The fine reject from the ring-shaped space behind the pulsation drum will in this way have a very low content also of less heavy impurities like sand, rust and the like, the result being that this reject can be refined with less risk and wear to the milling and defibrating organs and then be returned to the injecting matter to the device according to the invention. Said return takes place without any harmful effects of accumulation of milled-down or defibrated wood impurities in the subsequent fine-screening through the inner screening drum.

Below examples show different designs of pulsation organs in combination with screen openings to show the invention.

Figure 1:
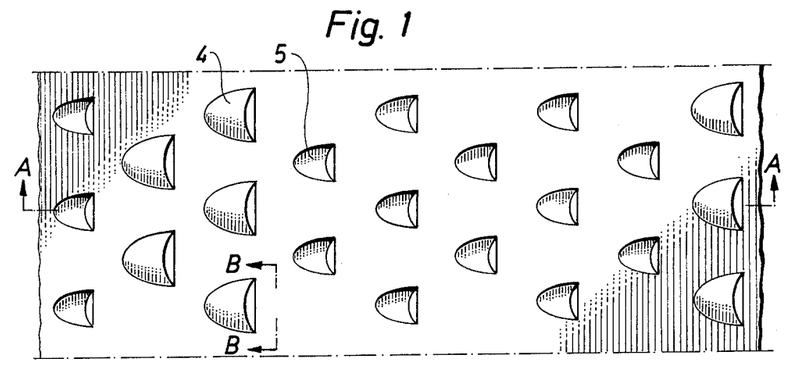
FIGS. 1–28 show different species of pulsation organs according to the invention and FIGS. 29 and 30 show two alternative screen devices according to the invention.
Figure 2:
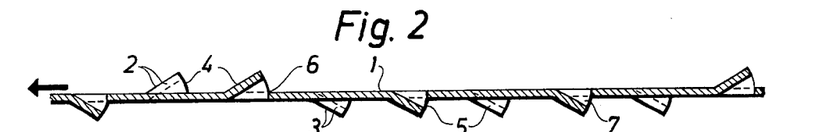

FIGS. 1 and 2 display the mantle of a pulsation drum, made out of sheetmetal, where in FIG. 1 part of the mantle is extended in plane, FIG. 2 being a section along the line A — A in FIG. 1. This is a horizontal section of the drum which has a vertical center shaft. The drum is intended to rotate as shown by the arrow to the left in FIG. 2. The sheet-metal mantle 1 is provided with so-called eye-lid perforations, whose front sides 2 and 3 in the direction of rotation constitute pulsation organs 4 on the outside of the drum and 5 on the inside of the drum.

Figures 3, 5:
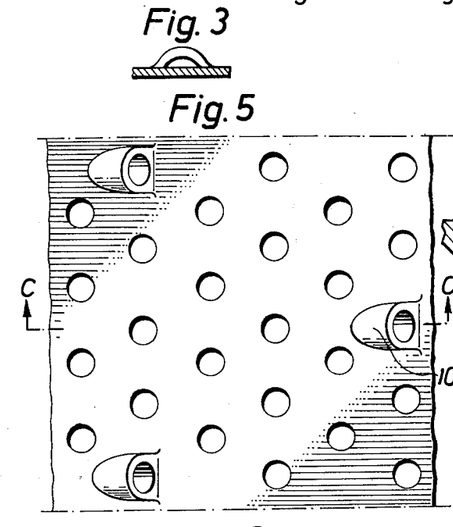

FIG. 3 shows screen openings 6 of pulsation organ 4 viewed from section B — B in FIG. 1. When the drum rotates quickly, a pressure wave ensues in the suspension on the front sides of pulsation organs 4 and 5, and a suction wave on their leeward sides. The inwards flow of the suspension through the drum is thus counteracted in respect of screen openings 6 by pulsation organs 4 and are facilitated in respect of screen openings 7 by pulsation organs 5. The strength of the pressure and suction waves depends, besides by the design of the pulsation organs, mainly on the peripheral velocity of the drum relative to the peripheral velocity of the suspension in the liquid layers in question. At the relatively high peripheral speeds of the drum here concerned, range 7 – 15 m/sec., the design of the pulsation organs in respect of propelling effect on the suspension is of major importance to the pulsation effect and to the flow performance of the suspension through the screen openings at pulsation organs 4 and 5 respectively. The total of the propelling effect of pulsation organs 4 and 5 respectively should be as small as possible. By aid of the above shown pulsation organs 4 and 5, both individually equally large and of identical design, a sufficient difference is achieved in the flow of the suspension through the screen openings of the respective pulsation organs to cause heavier particles, that may have passed inwards through screen openings 7 at pulsation organs 5, to be returned by the centrifugal force outwards towards the weaker inflow through screen openings 6 at pulsation organs 4, which are fewer in numbers, e.g. as shown by the FIGS. In order that such a return take place the incoming overpressure in the suspension must not be so high that the flow speeds through the screen openings become excessive.

Pulsation organs 4 are shown in vertical rows or groups but may of course be arranged in horizontal or oblique rows or groups.

Figure 4:
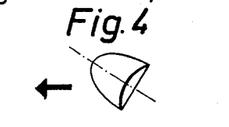

FIG. 4 shows a pulsation organ 4 obliquely arranged relative to the other pulsation organs. The upwards inclination has i.a. a down-feed effect on the spiralling movement of the suspension downwards along the drum. A downwards inclination has a back-keeping effect. The inclination can be varied in respect of pulsation organs 4 and 5 or for groups of these, respectively.

Figure 6:
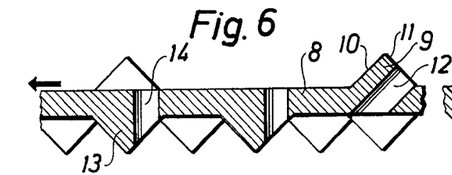

FIG. 5 shows part of the drum in cast condition, extended in plane, and FIG. 6 is a section thereof along the line C — C in FIG. 5. The drum is designated 8 and intended to rotate to the left in FIGS. On the upper side (the exterior of the drum) is pulsation organ 9 with front side 10 reversedly placed as viewed in the direction of rotation, and constituting part of a cylinder. The back or leeward side 11 is plane and arranged in approximately 90° angle to the front side. As screen opening it has a hole 12 with the same inclination as the front side. Pulsation organs 13 on the opposite side may be similarly designed or have a radial screen opening 14. Pulsation organs 9 and 13 are shown in equilateral, triangular partition with a free hole area of preferably fully 20% of the mantle surface, 80% whereof preferably to fall on holes 14. The pressure and suction waves, mentioned under the first design according to FIGS. 1 and 2, selfevidently are in certain relation to the size of the pulsation organs. Behind each pulsation organ there ensues, at the peripheral speeds here concerned, a whirl with a powerful suction effect in the respective hole orifices on the leeward side of the pulsation organs. The size and height of the pulsation organs, the inclination of the front side and the leeward plane, and the number and grouping of the pulsation organs are to be adapted according to the pulsation effects required for different types of fiber suspensions and their fiber concentration during the progressing purification sequence downwards in the apparatus according to pat. appl. 2528/71, both in the chamber outside the drum and in the chamber inside it.

The difference in the inward flow speed of the suspension (downwards in FIGS.) through holes 14 and 12 respectively increases relative to corresponding holes in FIGS. 1 and 2. The peripheral velocity of the drum and the ingoing overpressure on the outside of the drum can be so adjusted that the flow speed in holes 14 approaches zero, alternatively turns into a weak outward flow (upwards in FIGS.). The outward return, particularly of heavier impurities gets effective and the screen apparatus less sensitive to pressure and speed variations.

Figure 7:
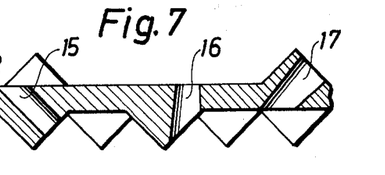

Hole and pulsator partition in the design according to FIG. 7 is the same as in the design according to FIG. 5 – 6. Holes 14 in FIG. 6 have their correspondence in holes 15 which are cylindrical but inclined in the rotation direction. Holes 16 are radial and tapering inwards. Holes 12 in FIG. 6 have their counterparts in holes 17 which are conical. The holes in FIG. 7 entail certain changes in the flows through the respective holes as compared with corresponding holes in FIG. 6 under otherwise identical conditions as regards ingoing overpressure and peripheral speeds for the drum which may be regarded as a kind of centrifugal pump functioning over the so-called confined point with the holes acting as a kind of blades.

Figure 8:
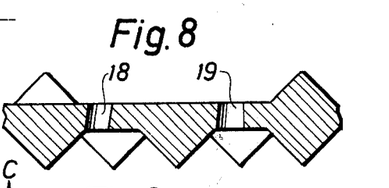

In FIG. 8 the holes have been arranged at the side of the pulsation organs and are radially directed. Holes 18 are cylindrical and holes 19 conical.

Figure 9:
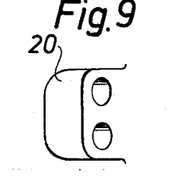

FIG. 9 shows a pulsation organ 20 with two holes. The pulsation organs or a selected part thereof may be provided with more holes.

Figure 10:
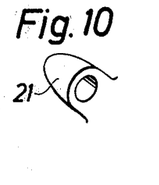

FIG. 10 shows a pulsation organ 21, obliquely arranged in the rotation direction. The degree of inclination can be varied in respect of the outer and inner groups of pulsation organs and also within the respective groups; refer to above.

Below will be described a number of different designs of pulsation organs which are particularly suitable for drums made of sheet-metal.

Figure 11:
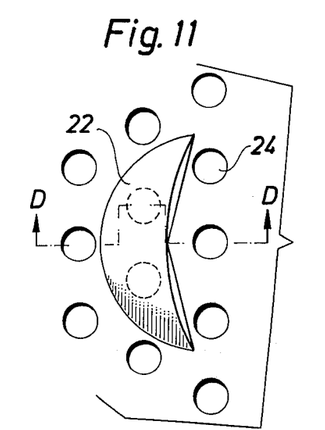
Figure 12:
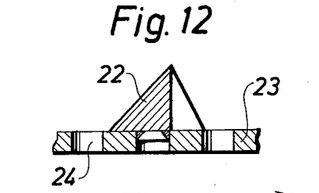

FIG. 11 shows a separate pulsation organ 22 welded to a perforated sheet-metal drum 23, part of which is displayed in the plane. The screen openings 24 are cylindrical as shown by the figure and/or conical in socalled equilateral, triangular partition. FIG. 12 shows a section of the pulsation organ along the line D — D in FIG. 11. The pulsation organ can also be riveted to the drum, possibly simultaneously with a similar organ on the other side of the drum, or attached by other means.

Figures 13, 14:
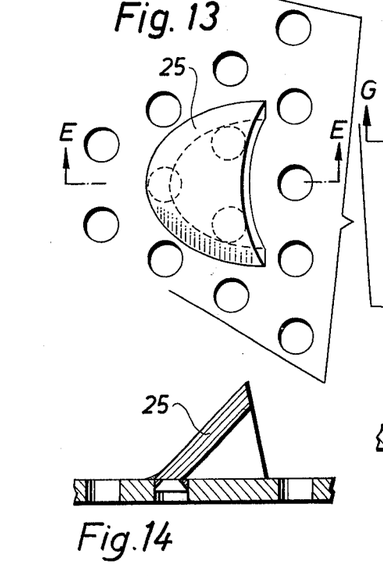

FIG. 13 shows another pulsation organ 25, for instance made from a section of a pipe, also welded on to a hole-punched, preferably perforated drum, part whereof is displayed in the plane.

FIG. 14 is a section of the pulsation organ along the line E — E in FIG. 13. The screen openings are identical with those in FIGS. 11 and 12. If the pulsation organ 25 is located in such way that its projection against a plane normal to the rotation direction gets large, preferably larger than its projection against the mantle surface of the screening drum, the disintegration effect of the device is facilitated which may in certain cases be preferable.

Figure 15:
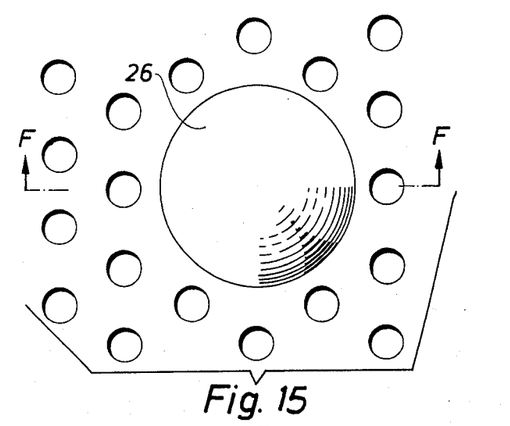
Figure 16:
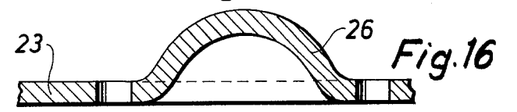

Pulsation organ 26 in FIG. 15, shown as a section in FIG. 16 along the line F — F, is bowl-shaped, as a part of a sphere, and pressed into nonperforated areas of drum mantle 23, preferably prior to bending of same, the drum mantle being hole-punched as in FIGS. 11 and 13.

Figure 17:
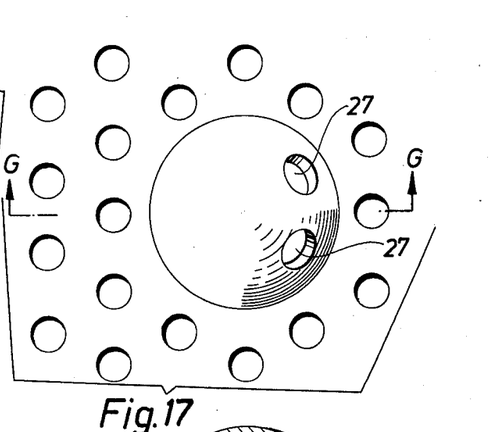
Figure 18:
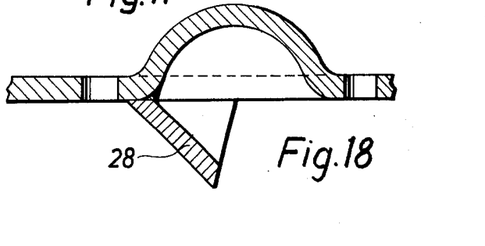

FIGS. 17 and 18 (the latter being a section along line G — G in FIG. 17) display a similar pulsation organ and drum, the pulsation organ here being provided with holes 27 on its leeward side and/or with reversedly located pulsation organs 28, similar to pulsation organ 25 in FIGS. 13 and 14.

Figures 19, 20:
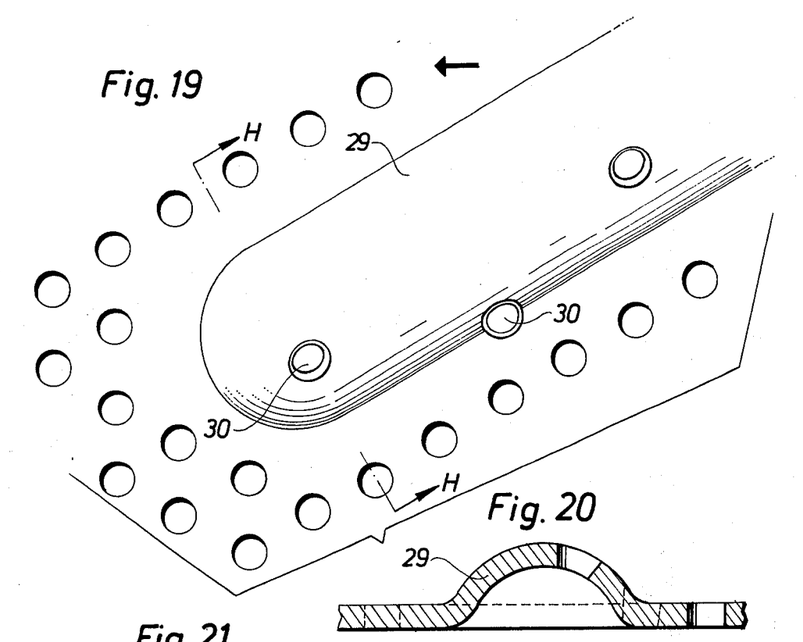

FIG. 19 shows a long pulsation organ 29, a cross-section whereof is shown in FIG. 20. The pulsation organ is pressed into non-punched parts of the mantle which is devised as shown in preceding FIGS. Alternatively, the pulsation organ can be provided with holes 30 on its leeward side.

Figure 21:
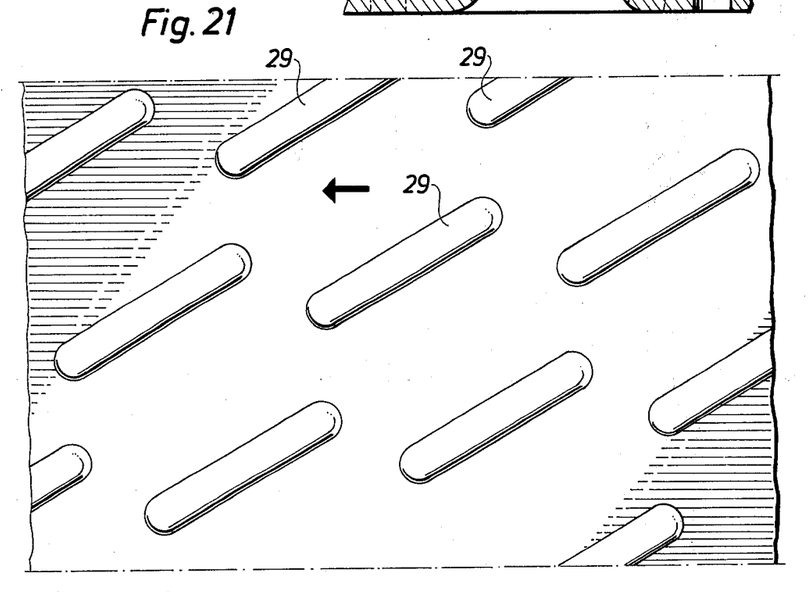

FIG. 21 displays pulsation organ 29 in smaller scale. The grouping is shown on a plane drum mantle.

Figure 22:
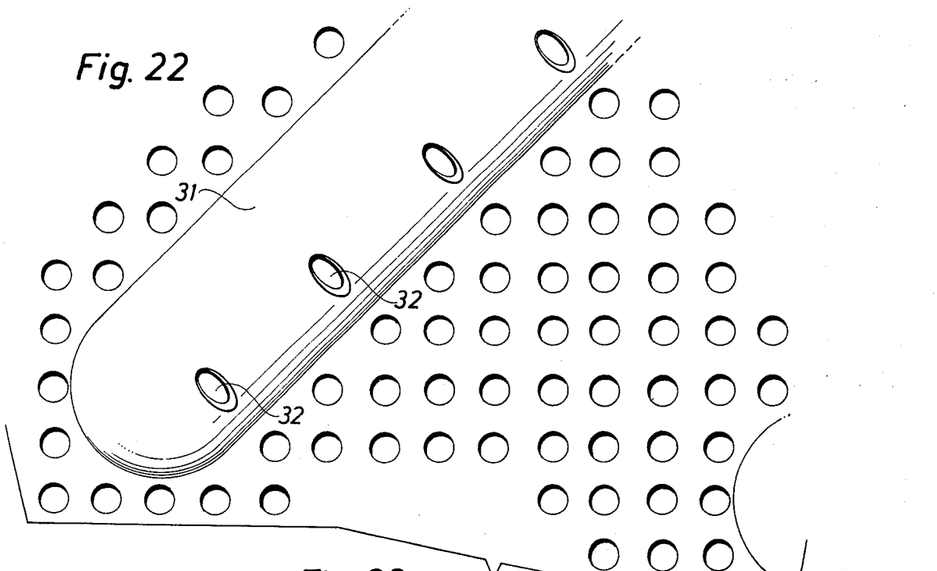

FIG. 22 displays a similar pulsation organ 31, but here the perforation in the sheet-metal mantle is of so-called square type. Alternatively, the pulsation organs can be provided with holes 32 on the leeward side.

Figure 23:
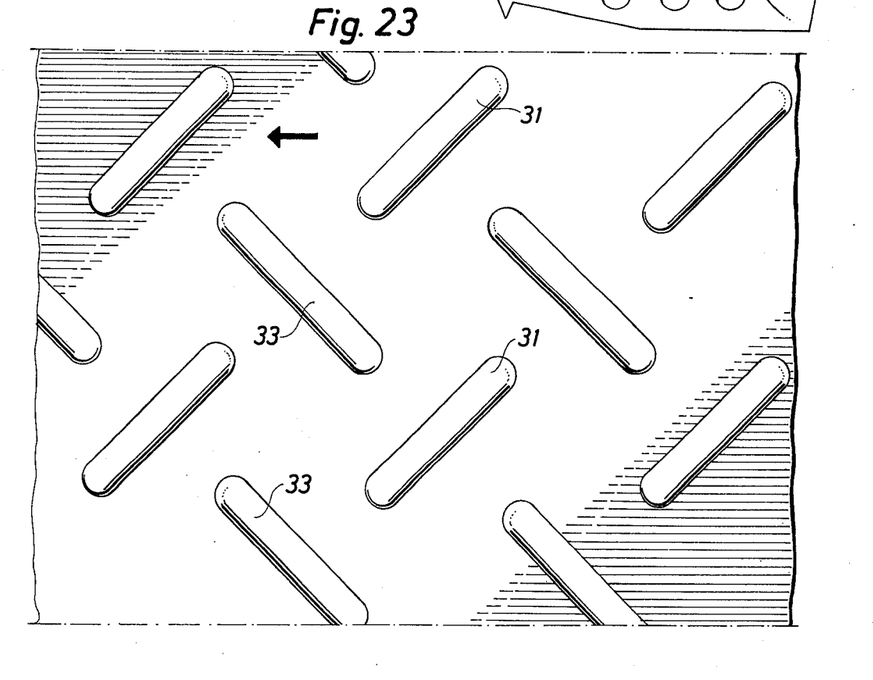

FIG. 23 shows the pulsation organ in smaller scale in a different grouping and with different lengths of pulsation organs 31 and 33, seen in the rotation direction as inclining upwards - backwards (31), respectively downwards - backwards (33).

Figure 24:
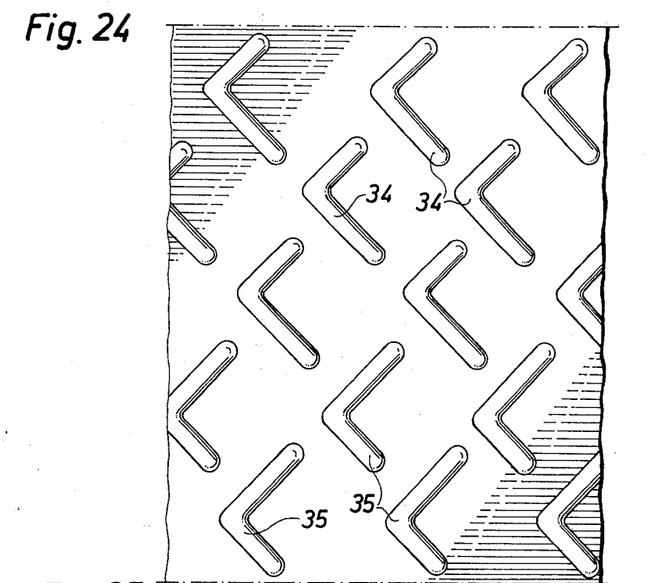

FIG. 24 displays another grouping of pulsation organs 34 and 35, in this case hook-shaped with unequally long legs upwards and downwards the drum.

Figure 25:
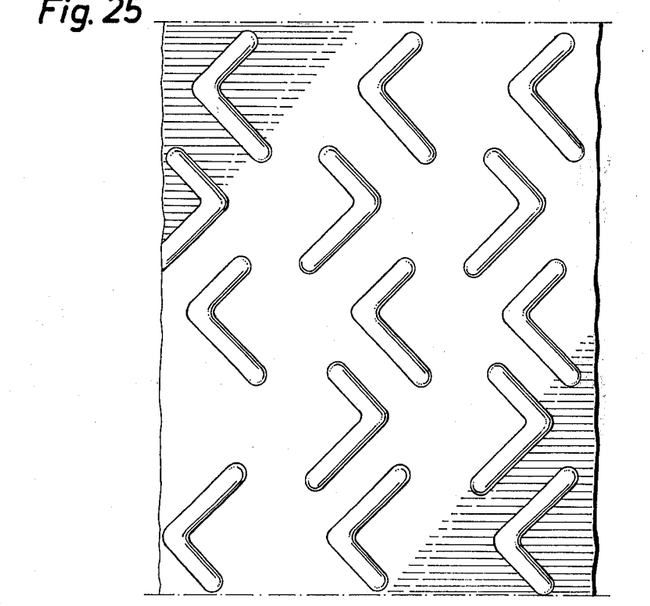

FIG. 25 shows the same pulsation organ as in FIG. 24, but here the pulsation organs of the second and fourth rows in the figure are placed with the open hook in the rotation direction. The pulsation organs according to FIGS. 15 – 25 can also be made in corresponding section to be welded, riveted or otherwise attached to the drum mantle plane or as finished drum, which is provided with different screen openings. In this way an existing combination of pulsation organs can be supplemented in case of need.

Figures 26, 27:
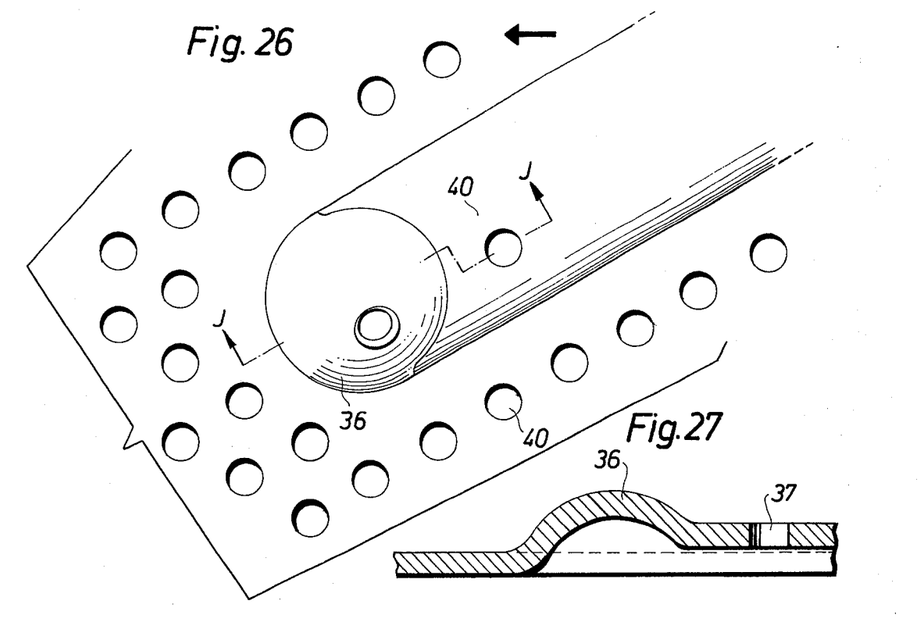
Figure 28:
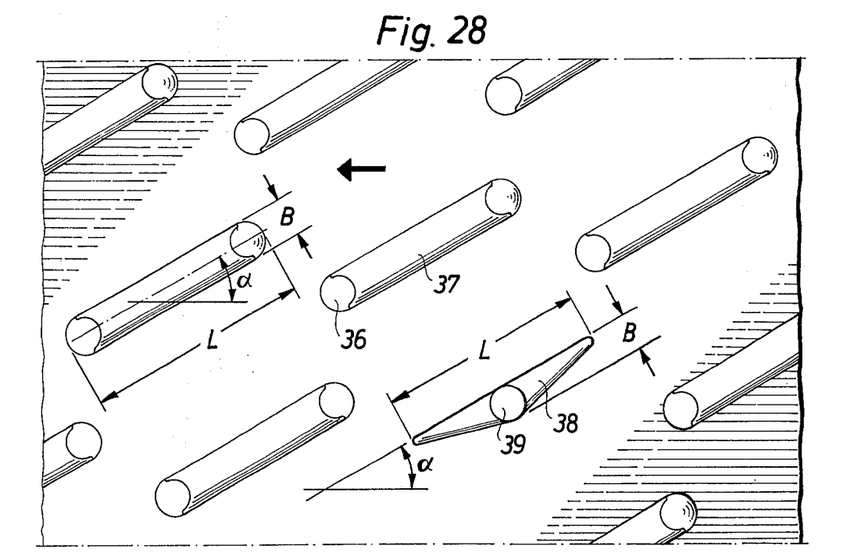

FIGS. 26, 27 and 28 (FIG. 27 is a section along J — J in FIG. 26) show a design which gives a favourable combination effect. The spherical sectors 36 produce an efficient pulsation and the intermediate smaller and protruding parts 37 provide a desirable guiding effect on the axial movement of the materials suspension as well as a certain pulsation effect. If the mantle of the pulsation drum is moved in the direction of the arrow and the materials suspension is fed in from above, the aforementioned intermediate parts 37 will counteract the downward movement of the suspension if the angle alfa is larger than 0° and smaller than 90°. By this the processing time is extended. If, on the other hand, the angle is chosen in the 90° – 180° range, the intermediate parts will contribute to an increase of the speed of the downward feed. It is consequently possible by aid of each part to achieve both an efficient pulsation and a guiding of the movement of the suspension across the screen surface.

In order that the above effect be achieved with the design according to FIGS. 26 – 28 is required that the pulsation/guiding organ is of the extension as to length and height as is required for achieving the intended effect. Since the height extension of the guiding organ is limited because of the risk of jamming caused by knots or major particles in the space outside the drum, the pulsation/guiding organ must be dimensioned in length with a certain minimum extension which preferably may be defined as a function of the width of the organ. According to the invention said relation is to be not less than 5:1, i.e. the length L measured along the mantle surface is to be not less than five times as large as the width B.

In FIG. 28 a modified design is shown. The guiding organ 38, which also produces a certain pulsation effect, is arranged on both sides of the actual pulsation organ 39. In order to obtain a uniform design, all organs are preferably to be devised either according to design 36 – 37 or design 38 – 39, although both types may naturally be used on one and the same drum, internally and/or externally. Screen openings 40 are arranged between and/or in organs 36 – 39 as shown in FIGS. 26 and 27.

By way of introduction was stated that the pulsation organs according to the invention are particularly suitable for the knot-catching drum according to pat. appl. 2528/71. The pulsation organs can also be used to advantage for a knot-catcher, preferably closed-type, i.e. a screening apparatus intended exclusively for removing of knots and coarse impurities. This design can, in principle, be obtained by excluding the drum for finescreening in FIG. 2 of pat. appl. 2528/71. The screen device would in such case comprise only one screening drum (the outer drum with pulsation organs according to aforementioned pat. appl.) Under this alternative a special disintegration effect can be obtained if the pulsation drum is made more robust, preferably cast, e.g. as in FIGS. 6 – 10, and if likewise the mantle devised outside the drum is made sturdier and provided with bulges which interact with the pulsation organs and the pulsation drum. At the same time an efficient primary sorting is in this case obtained.

The above mentioned and shown designs and combinations of pulsation organs and different groupings thereof only serve to illustrate the invention and do not cover all designs, combinations and groupings that are within the scope of the invention.

Figure 29:
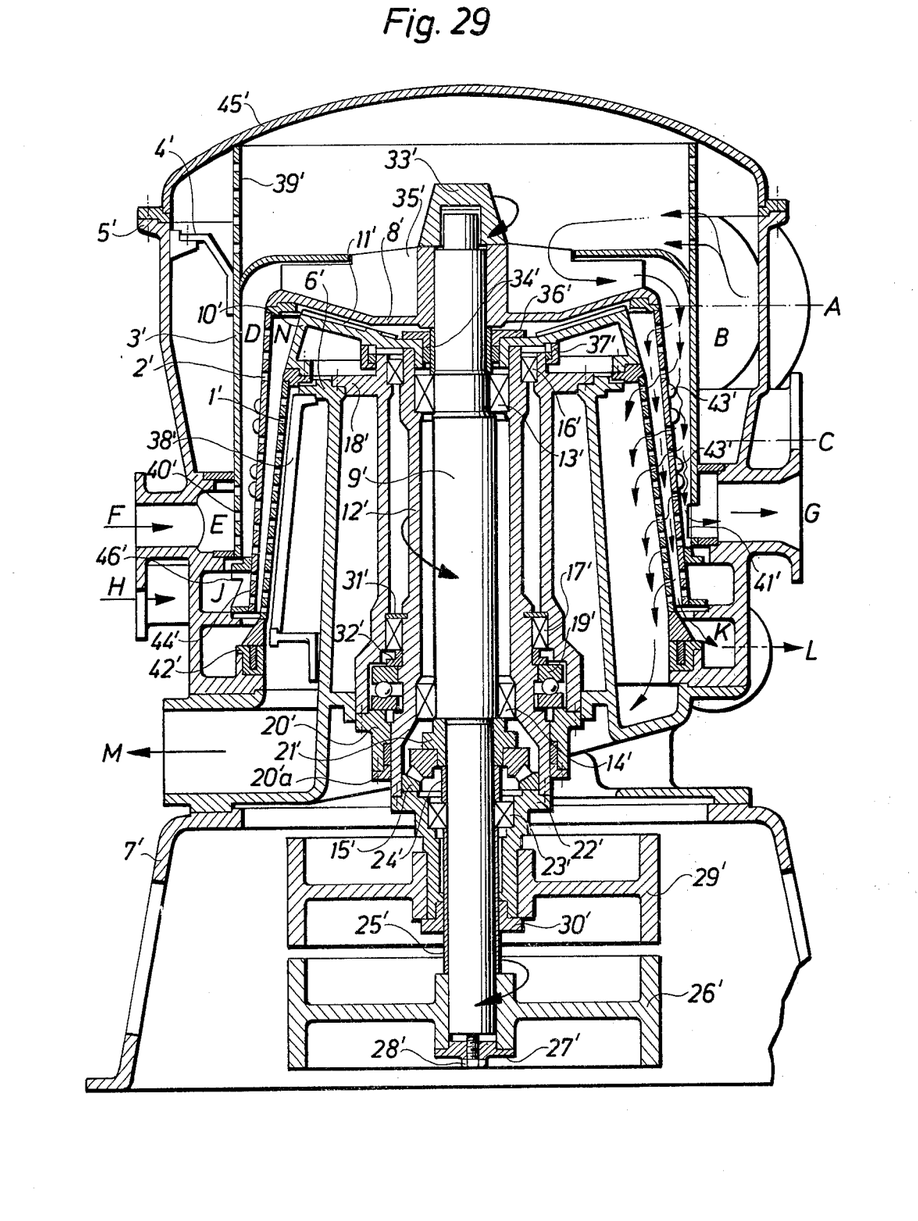
Figure 30:
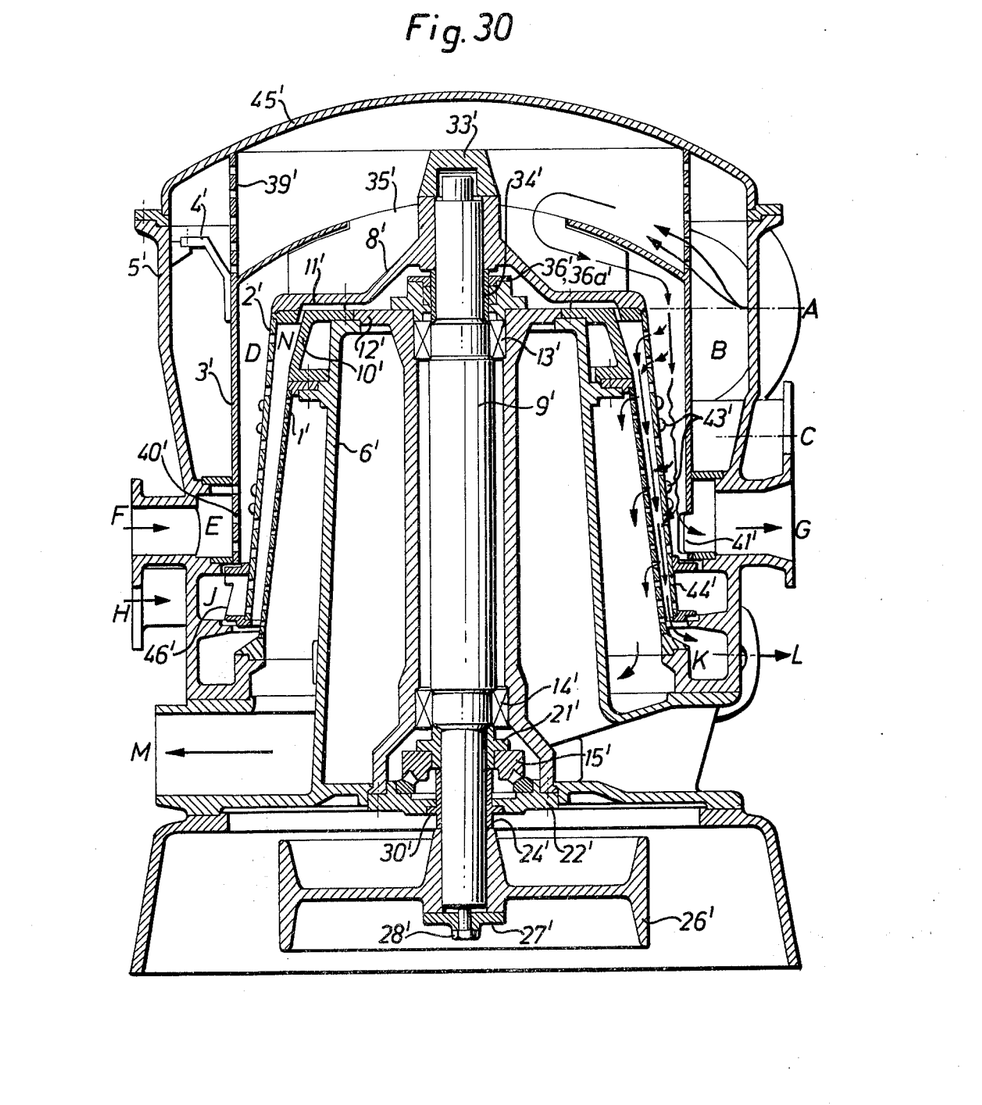

In FIGS. 29 and 30 are shown the two alternative screening devices according to pat. appl. 2528/71 which are particularly suitable for the screening drum, according to the invention, which is provided with pulsation organs.

The device according to FIG. 29 consists in its principal parts of a highspeed rotary screening drum 1' and, concentrically with and outside it, a highspeed rotary knot-catching and pulsation drum 2', and concentrically with these drums a stationary mantle 3' attached with a holder 4' to a screen casing 5' which is fixedly attached to a supporting frame 6' which in turn is mounted on to a base stand 7'.

The knot-catching drum 2' is at the top attached to a cover 8' which is rigidly mounted on a rotary shaft 9'. The screening drum 1' is at the top attached to a cover 10' equipped with low pump blades 11'. The cover 10' is fixedly mounted on to a sleeve 12' mounted against the shaft 9' in radial bearings 13' and 14' and thrust bearings 15'. The sleeve 12' is externally carried in radial bearings 16' and 17' against bearing support 18' attached at the top to the supporting frame 6' and at its base inserted into the latter. Axially, the sleeve 12' is mounted to the bearing support 18' in thrust bearing 19' and a casing 20' fitted to the support 18' and provided with stuffing and sealing 20a'. The axial load on the shaft 9' is transferred via a ring 21' to bearing 15' and is absorbed by a casing 22' attached to the sleeve 12'. The radial bearing suspension of the shaft 9' is reinforced by a radial bearing 23' which is secured to shaft 9' by a screw 28' via the ring 21', wear linings 24' and 25', a driving pulley 26', and a washer 27'. Another driving pulley 29' for the screening drum 1' is fixedly mounted on casing 22' using a stuffing box sealing 30'.

The axial load on sleeve 12' is absorbed by a Seeger ring 31' and transferred via the bearing 17', a ring 32', and bearing 19' to the casing 20' screwed on to sleeve 12' which is inserted into a fitting in the supporting frame 6'.

A nut 33' secures the cover 8', a wear lining 34' and the bearing 13' to the shaft 9'.

The cover 8' is equipped with blades 35'.

The cover 10' is devised with stuffing boxes 36' and 37'.

Connecting on to the inner side of screening drum 1', pulsation blades 38' are mounted on the supporting frame 6'. One or more of these blades 38' may be hollow and devised for adding of flushing water outwards toward screening drum 1' for extra cleaning of its screening organ at the same time as the water being flushed through the drum dilutes the pulp on the outside of the drum to its full height.

The mantle 3' is in its upper part 39' coarsely perforated ($\phi$ 20 – 25 mm) and in its lower part 40' perforated for adding of flushing or excess water and provided with an outlet 41' for knots etc.

The screening drum is devised at the base with a seal 42', shown in socalled mechanical version.

The knot-catching and pulsation drum 2' is devised with pulsation-generating deformations 43' on its surface.

At the lower part of the drum 2' pressure water is introduced for dilution or flushing, partly through perforation 44' and, partly, through slots 46' at the two lower flanges of the drum 2'.

The apparatus is closed at its top with a cover 45'.

The driving pulleys 26' and 29' are driven via V-belt transmissions not shown by ditto separate electric motors, diamentally located in order to reduce the lower radial bearing loads.

Mode of operation:

The pulp, i.e. the incoming matter, is fed into the apparatus tangentially at A, enters the ring-shaped waste chamber B from where waste etc. is drained off when necessary at G. The pulp is peripherally distributed and flows inwards through the coarsely perforated mantle part 39', is accelerated to suitable speed and required pressure by the blades 35', being simultaneously defibrated, enters in a dispersed state the ring-shaped chamber D, flows against the centrifugal and pumping force, exerted by knot-catching drum 2', through the perforated zones of the latter where it is freed from knots, remaining pulp being diluted with pressure water added to chamber E at F through perforation 40' in the mantle 3'. The knots are fed out through outlet 41' with suitable counter-pressure at G.

The pulp, screened from knots, flows into the ring-shaped chamber N and inwards through the turbulent liquid layer proceeding through the perforation of the screening drum 1' which is locally cleaned by aid of pressure blasts from blades 38'.

At the lower part of screening drum 1' pressure water for dilution of remaining pulp is added at H to chamber J.

The remaining pulp, i.e. the reject, enters chamber K and is evacuated at L at suitable counter-pressure by aid of which the volume/quantity is regulated.

The pulp passed through screening drum 1', i.e. the accepted pulp, is evacuated at M.

A simplified design is shown in FIG. 30 which is a central vertical section of the apparatus, also in this case with a vertical shaft. The corresponding components etc. have the same figure and letter designations as in FIG. 29.

This design is principally intended for more easily screened and shortfibred pulps.

The principal difference between the two designs is that in the latter the screening drum 1' is stationary.

The knot-catching and pulsation drum 2' is now attached to the cover 8' which is fixedly mounted on the shaft 9'. The cover 8' is provided with blades 35' and 11'.

On the upper flange of the screening drum a ring 10' is screwed on. The screening drum with ring is secured at the upper flange of the drum to the flange on the supporting frame 6' and, at the same time, at the base, on to the lower flange of the screen casing 5'. The ring 10' is screwed on at the top to the upper flange of the supporting frame 6'.

The bearing sleeve 12' is at the base fitted into the supporting frame 6' and screwed on to it at the top.

The shaft 9' is mounted on to the bearing sleeve 12', at the top in radial bearing 13' and at the base in radial bearing 14'. The axial load on shaft 9' is absorbed by the ring 21', the thrust bearing 15' and a cover 22' screwed on to the bearing sleeve 12' and equipped with a Stefa seal 30'.

The washer 27', the driving pulley 26', the wear lining 34' and the bearing 13' are secured against shaft 9' with the nut 33'.

The bearings are sealed at the top with stuffing boxes 36' and 36a'.

The mantle 3' is in its upper part coarsely perforated ($\phi$ 20 – 25 mm) and in its lower part 40' suitably perforated for the adding of pressure water and provided with an outlet 41' for knots.

The knot-catching and pulsation drum 2' is devised with pulsation-generating deformations 43' on its surface. In the lower part of the drum pressure water is introduced through perforation 44' for diluting purposes.

The apparatus is closed at the top with the cover 45'.

The driving pulley 26' is driven via a V-belt transmission, not shown, by a ditto electric motor.

Mode of operation:

The pulp, i.e. the incoming matter, is fed into the apparatus tangentially at A, enters the ring-shaped waste chamber B from where waste etc. is drained off when necessary at G. The pulp is peripherally distributed and flows inwards through the coarsely perforated mantle part 39', is accelerated to suitable speed and required pressure by the blades 35', being simultaneously defibrated, enters in a dispersed state the ring-shaped chamber D, is screened from knots by the perforated zones of the drum 2' and is defibrated/deflocculated by the zones with protrusions 43', and is diluted with pressure water through perforation 40' in the mantle 3'. This perforation communicates with outlet 41' causing the knots to evacuate at suitable counter-pressure at G by means of which the volume is regulated.

The pulp flows against the centrifugal and pumping force exerted by the knot-catching drum 2' and the liquid layer rotating on its inside, through the drum into the ring-shaped space N between the drums and passes the boundary layer close to screening drum 1' and through the latter.

At the lower part of screening drum 1' pressure water is added through the perforations 44' of screening drum 2' for diluting purposes. The remaining pulp, the reject, enters chamber K and is evacuated at L at suitable counter-pressure by aid of which the volume is regulated.

The pulp passed through screening drum 1' i.e. the accepted pulp, is evacuated at M.

In addition, different modifications of these devices are possible, e.g. the following:

a: in order to eliminate seal 42' in the design according to FIG. 29, the accepted pulp may be extracted at the top in which case the seal is placed between the accepted pulp and the incoming matter, possible leakage preferably being from accepted pulp to incoming matter. There are on this point different solutions, depending on whether the apparatus is operating in a pulp pipeline under comparatively high pressure or if the accepted pulp can flow off "freely" at the top.

b: in the design according to FIG. 30 with a stationary screening drum, the blades 38' may be rotary and driven at suitable speed in the same way as the screening drum in the design according to FIG. 29.

c: in the design types referred to a vertical center shaft is used. They may however preferably use a horizontal shaft, especially if this would make the design simpler and more rational.

d: when the apparatus is placed so far towards the beginning of the process that the fiber suspension is already screened from knots, this purification stage is naturally deleted, which means that pressure water need not be added at F and that the knot outlet G does not have any knot-removing function. The pressure water inlet and the knot outlet are in this case to be closed in some suitable way, e.g. by blank-flanging. It is of course also possible to make the construction cheaper by building the apparatus without the above-mentioned pressure-water inlet and/or knot outlet. Should waste collection not be needed also waste chamber B can be deleted and possibly also the coarsely perforated mantle part 39′.

I claim:

1. A device for purifying and fractionating a material suspension, notably a fiber suspension, under pressure, said device including
    a treatment chamber having a circular cross-section, with an inlet for the suspension and outlets for reject and accept, respectively;
    a screening drum having a circular cross-section and rotatable in the treatment chamber, said drum being provided with pulsation organs;
    said inlet being exterior of said drum,
    each pulsation organ having a limited extension along the axial dimension of said drum, and a rounded front surface, said organ being adapted to create pulsations in the suspension layer close to the screening drum,
    said drum being perforate to provide an array of screen holes spaced on the surface of said drum,
    the number of screen holes being considerably larger than the number of pulsation organs and
    at least one screen hole being located on the surface of each said pulsation organ at its leeward side, viewed in the direction of rotation of said drum, thereby causing a local return flow outwardly through said screening drum.

2. A device according to claim 1, said pulsation organs being arranged on both the outside and the inside of the screening drum.

3. A device according to claim 2, characterized by the screening drum being provided on its inside with a greater number of pulsation organs than on its outside.

4. A device according claim 1, characterized by the pulsation organs being at an angle to the rotation direction of the screening drum.

5. A device according to claim 4, characterized by the pulsation organs being inclined upwards, setting out from their front surface.

6. A device according to claim 4, characterized by the pulsation organs being inclined downwards, setting out from their front surface.

7. A device according to claim 4, characterized by the pulsation organs being inclined, in part upwards and in part downwards, setting out from their front surface.

8. A device according to claim 1, characterized by said drum being of sheet metal and said pulsation organs being pressed out in the sheet-metal of the screening drum.

9. A device according to claim 1, characterized by the pulsation organs being prolonged and of a length five times exceeding their width.

10. A device according to claim 9, characterized by the pulsation organs being angular.

11. A device according to claim 9, characterized by the pulsation organs being provided with at least one bowl-shaped protuberance which ascends above the rest of the pulsation organ.

12. A device according to claim 11, characterized by a bowl-shaped protuberance being centrally located on each pulsation organ.

13. A device according to claim 11, characterized by a bowl-shaped protuberance being located at each end of each pulsation organ.

14. A device according to claim 11, characterized by certain pulsation organs having a centrally located bowl-shaped protuberance and others having a bowl-shaped protuberance at each end.

15. A device according to claim 1, characterized by the projection of the pulsation organs against a plane normal to the direction of rotation being larger than the projection of the organs against the surface of the screening drum.

16. A device for purifying and fractionating a material suspension, notably a fiber suspension, under pressure, said device including
    a treatment chamber having a circular cross-section, with an inlet for the suspension and outlets for reject and accept, respectively;
    a screening drum having a circular cross-section and rotatable in the treatment chamber, said drum being provided with pulsation organs;
    said inlet being exterior of said drum,
    each pulsation organ having a limited extension along the axial dimension of said drum on its exterior surface, and a rounded front surface, said organ being adapted to create pulsations in the suspension layer close to the screening drum,
    said drum being perforate to provide an array of screen holes spaced on the surface of said drum,
    the number of screen holes being considerably larger than the number of pulsation organs and
    at least one screen hole being located on the drum surface adjacent to said pulsation organ on its leeward side viewed in the direction of rotation of said drum, thereby causing a local return flow outwardly through said screening drum.

* * * * *